(12) United States Patent
Wagner

(10) Patent No.: US 6,952,859 B2
(45) Date of Patent: Oct. 11, 2005

(54) SPRING HINGE

(75) Inventor: Reiner Wagner, Ispringen (DE)

(73) Assignee: OBE Ohnmacht & Baumgartner GmbH & Co. KG (DE)

( * ) Notice: Subject to any disclaimer, the term of this patent is extended or adjusted under 35 U.S.C. 154(b) by 0 days.

(21) Appl. No.: 10/333,310

(22) PCT Filed: Apr. 9, 2002

(86) PCT No.: PCT/EP02/03899

§ 371 (c)(1),
(2), (4) Date: Jan. 14, 2003

(87) PCT Pub. No.: WO02/099512

PCT Pub. Date: Dec. 12, 2002

(65) Prior Publication Data

US 2004/0020010 A1 Feb. 5, 2004

(30) Foreign Application Priority Data

Jun. 6, 2001 (DE) .......................... 101 28 383

(51) Int. Cl.⁷ .............................................. E05D 11/10
(52) U.S. Cl. ......................................... 16/228; 351/113
(58) Field of Search .............................. 16/228; 351/63, 351/111, 113, 121, 114, 140, 119, 153

(56) References Cited

U.S. PATENT DOCUMENTS

| 4,689,851 | A | * | 9/1987 | Beyer | 16/228 |
| 4,747,183 | A | * | 5/1988 | Drlik | 16/228 |
| 4,991,258 | A | * | 2/1991 | Drlik | 16/228 |
| 5,400,090 | A | * | 3/1995 | Chen | 351/113 |
| 5,533,233 | A | * | 7/1996 | Wagner et al. | 16/228 |
| 5,755,010 | A | * | 5/1998 | Lehnert | 16/228 |
| 6,095,646 | A | | 8/2000 | Montagner | 351/153 |
| 6,161,254 | A | * | 12/2000 | Montagner | 16/228 |
| 6,241,354 | B1 | * | 6/2001 | Schuchard et al. | 351/113 |
| 6,353,965 | B1 | * | 3/2002 | Lo | 16/228 |
| 6,390,620 | B1 | * | 5/2002 | Montalban | 351/114 |
| 6,547,389 | B2 | * | 4/2003 | Hotellier | 351/153 |

FOREIGN PATENT DOCUMENTS

| DE | 4415308 | | 11/1995 | | |
| DE | 19856117 | | 6/1999 | | |
| DE | 19856117 A1 | * | 6/1999 | | G02C/5/22 |
| EP | 639785 A1 | * | 2/1995 | | G02C/5/22 |
| EP | 0679920 | | 11/1995 | | |
| EP | 817987 A1 | * | 1/1998 | | G02C/5/22 |
| FR | 2641382 A1 | * | 7/1990 | | G02C/5/16 |
| FR | 2684456 A3 | * | 6/1993 | | G02C/5/22 |
| FR | 2719913 | | 11/1995 | | |
| FR | 2793323 | | 11/2000 | | |
| GB | 2268282 A | * | 1/1994 | | G02C/5/16 |
| WO | WO 9630800 A1 | * | 10/1996 | | G02C/5/22 |
| WO | 01/04689 | | 1/2001 | | |

OTHER PUBLICATIONS

German Office Action.
PCT International Search Report.

* cited by examiner

Primary Examiner—Chuck Y. Mah
(74) Attorney, Agent, or Firm—Ostrolenk, Faber, Gerb & Soffen, LLP

(57) ABSTRACT

An electrically weldable spring hinge comprising a housing having a cavity, in particular a cylindrical recess, into which cavity a hinge element can be inserted. A supporting body can be inserted into the cavity to block deformation of the housing at a location along the housing where electrical welding is performed. The hinge element may include a spring in the recess and the supporting body may be on the spring.

16 Claims, 4 Drawing Sheets

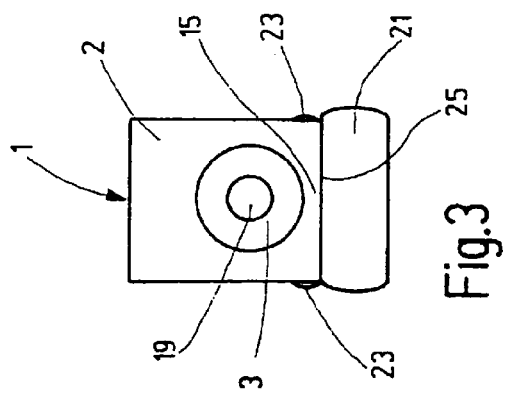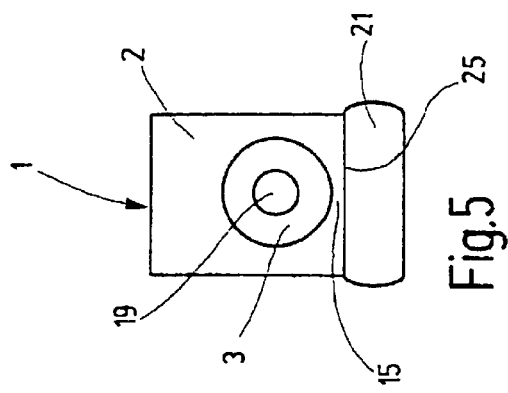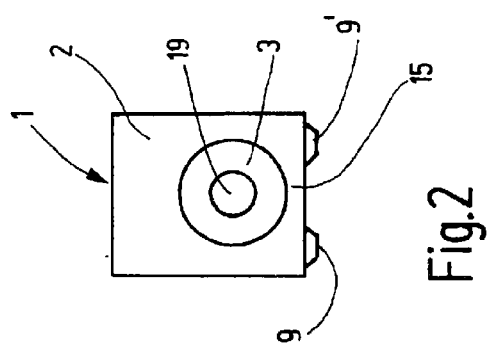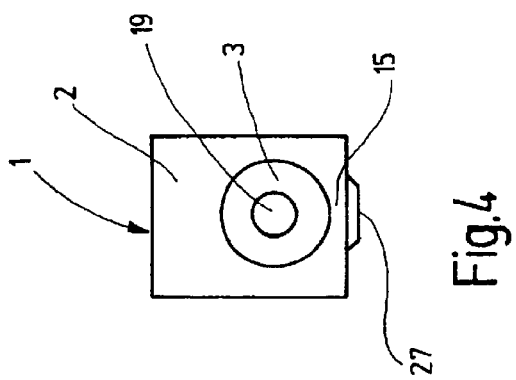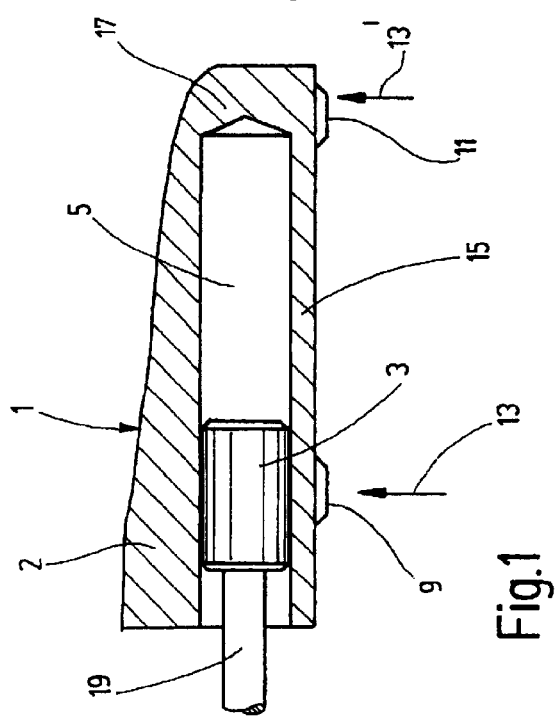

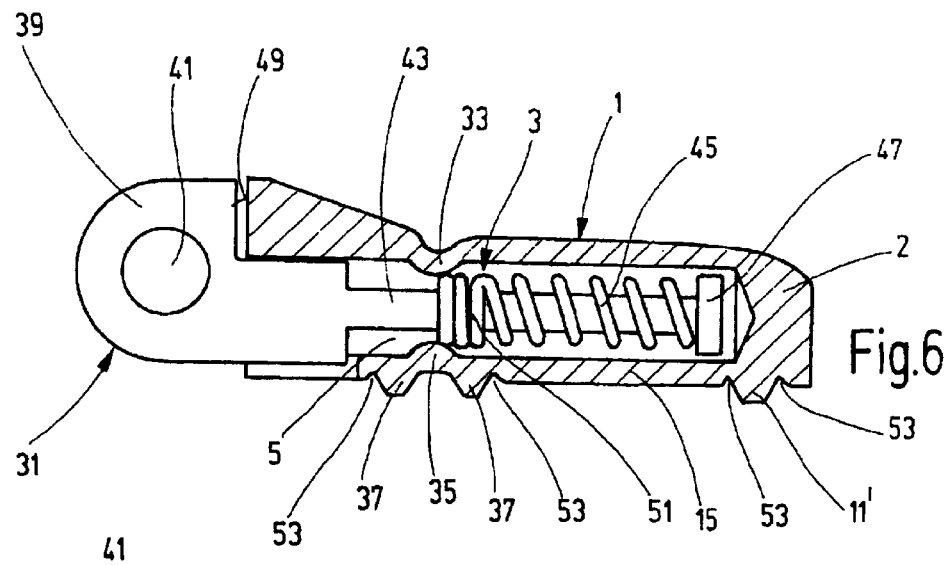
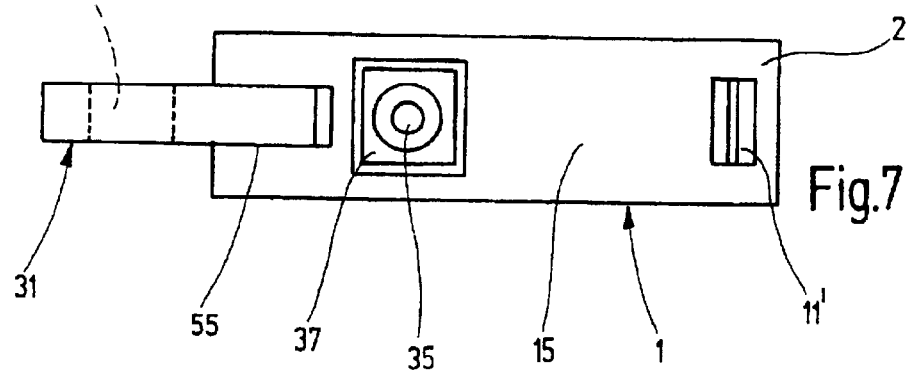
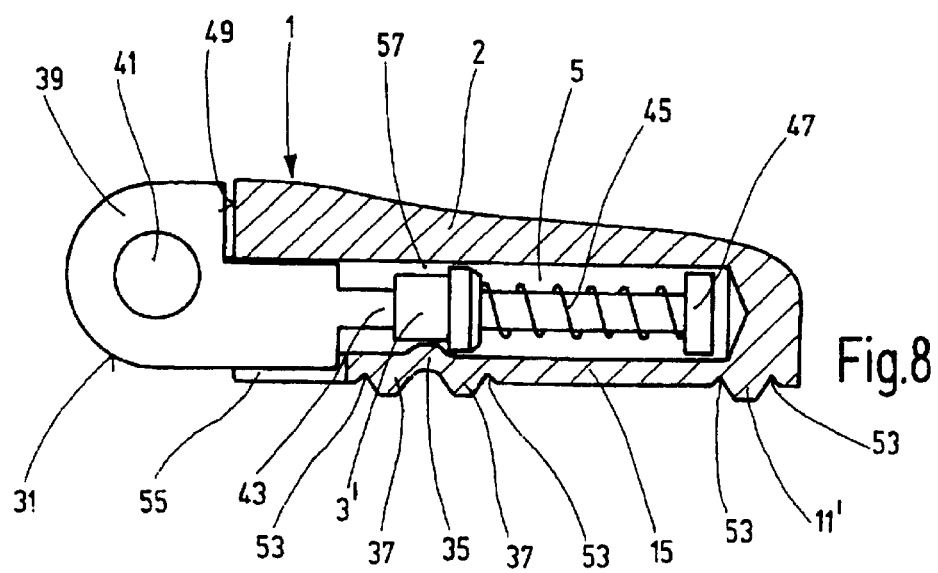

SPRING HINGE

BACKGROUND OF THE INVENTION

The invention relates to an electrically weldable spring hinge including a housing with a cavity therein for receiving a hinge element.

Spring hinges of this type are known. They are used as hinges for ear pieces of spectacles and are fastened to the ear pieces of the spectacles by means of an electric welding process. During the electric welding, the spring hinge is pressed firmly against an ear piece of the spectacles. The applied pressure is within a range of, for example, 70 to 700 N. As soon as the pressure forces are applied, a welding current of 2000 A to 8000 A is conducted via the housing and the ear piece. Welding projections are provided in the contact region between the spring hinge and the ear piece of the spectacles, which heat up and melt at the high currents. This produces a firm connection between the spring hinge and the earpiece of the spectacles. It has been found that, at the high pressure forces, deformation of the housing of the spring hinge, in particular of the cavity provided inside the housing, may occur. This cavity accommodates a hinge element. The latter is displaced inside the cavity during use of the spring hinge. During the electric welding, material displacements which impair optimum functioning of the spring hinge may also occur: it is possible for material to be displaced into the interior of the housing, namely into the cavity, so that a protrusion is produced there. If deformation of the housing and thus of the cavity takes place or if material is displaced into the cavity during the welding, the mobility of the hinge element relative to the housing is impaired and thus the functioning of the spring hinge is impaired. Such deformations of the housing occur in particular in small spring hinges, which are being increasingly used.

SUMMARY OF THE INVENTION

The object of the invention is therefore to provide a spring hinge of the type mentioned at the beginning which, despite very small dimensions, can be attached to an ear piece of spectacles in an optimum manner in an electric welding process.

To achieve this object, a spring hinge is proposed which is distinguished by the fact that the housing of the spring hinge has a cavity into which a supporting body can be inserted at least during the electric welding. This offers the advantage that the supporting body prevents undesirable material displacements caused by the electric welding process and that the supporting body stabilizes the housing during the welding and ensures an optimum flow of force.

A preferred embodiment of the spring hinge which is distinguished by the fact that the supporting body is designed as a separate part and can be removed from the cavity. This permits repeated use of the supporting body in the production process.

A further preferred exemplary embodiment is distinguished by the fact that the supporting body is part of a hinge element which can be inserted into the housing. This permits the smallest possible dimensioning of the cavity and thus of the spring hinge and saves two process steps during the production process, namely the insertion and removal of the supporting body.

A further preferred exemplary embodiment is distinguished by the fact that the supporting body is part of a spring element of the hinge element. In addition to a compact design of the spring hinge, this permits a simple construction with few parts and thus efficient manufacture of the spring hinge.

A further preferred exemplary embodiment is distinguished by the fact that the supporting body is designed as a guide element for the hinge element. In this case, a part of the spring hinge which is required anyway is designed in such a way that it additionally fulfills the function of the supporting body, a factor which ultimately reduces the number of individual parts of the spring hinge and thus permits cost-effective manufacture.

A further preferred exemplary embodiment is distinguished by the fact that the spring hinge can be attached to an ear piece of spectacles by means of an electric welding process. This permits a fixed connection between the spring hinge and the ear piece of the spectacles, which connection can be readily automated and can be carried out at defined temperature conditions.

A further preferred exemplary embodiment is distinguished by the fact that the housing of the spring hinge has at least two welding projections. This offers the advantage that, on account of the dimensioning and positioning of the welding projections, the welding currents and thus the flow behavior and the softening of the material can be established exactly.

A further preferred exemplary embodiment is distinguished by the fact that the supporting body is arranged in the region of a welding projection. Thus the applied pressure introduced via the welding projection and required for the welding can be absorbed by the supporting body and undesirable deformations of the housing of the spring hinge can also be prevented as a result.

A further preferred exemplary embodiment is distinguished by the fact that the hinge element can be inserted as a pre-assembled unit into the housing. This offers the advantage of an optimized and efficient manufacturing process.

A further preferred exemplary embodiment is distinguished by the fact that the spring hinge has a bead and/or latching elements for fixing the hinge element in the housing. In the production process, either the hinge element is inserted into the housing and latched there and/or the hinge element is inserted into the housing and fixed there by means of a bead to be incorporated. This offers the advantage of simple-to-produce and reliable fixing of the hinge element in the housing of the spring hinge.

A further preferred exemplary embodiment is distinguished by the fact that the bead is surrounded by a welding projection. This offers the advantage that the welding projection and the bead can be provided on the housing in the immediate vicinity of the supporting body.

A further preferred exemplary embodiment is distinguished by the fact that the supporting body has a groove and advantageously remains in the cavity of the housing. This offers the advantage that the bead can engage in the groove for fixing the supporting body.

A further preferred exemplary embodiment is distinguished by the fact that material displaced in a defined manner during the electric welding process fixes the hinge element in the housing. This offers the advantage that no latching elements or beads need be provided during the manufacturing process of the individual parts of the spring hinge, since the deformations occurring due to the welding process fulfill this function.

A further preferred exemplary embodiment is distinguished by the fact that the material displaced during the electric welding process engages in the groove of the supporting body. This offers the advantage that the supporting body is fixed in the housing during the process step of the welding and can serve as a stop for the spring element.

A further preferred exemplary embodiment is distinguished by the fact that the housing can be produced by means of MIM technology (Metal Injection Molding). In the MIM technology, relatively complicated shapes of the housing of the spring element can be realized in a similar manner to an injection molding process.

BRIEF DESCRIPTION OF THE DRAWINGS

The invention is explained in more detail below with reference to the drawing, in which:

FIG. 1 shows a longitudinal section of a housing with supporting body;

FIG. 2 shows a plan view of the end face of the housing;

FIG. 3 shows a plan view of the end face of the housing in the welded state with an ear piece of spectacles;

FIG. 4 shows a further exemplary embodiment of the housing in the same view as FIG. 2;

FIG. 5 shows a housing as in FIG. 4 in the welded state with an ear piece of spectacles;

FIG. 6 shows a partial longitudinal section of a spring hinge;

FIG. 7 shows a bottom view of the spring hinge shown in FIG. 6;

FIGS. 8 to 10 show further exemplary embodiments of the spring hinge shown in FIG. 6;

FIG. 11 shows a bottom view of the spring hinge shown in FIG. 10, and

DESCRIPTION OF THE PREFERRED EMBODIMENTS

Figure 12:
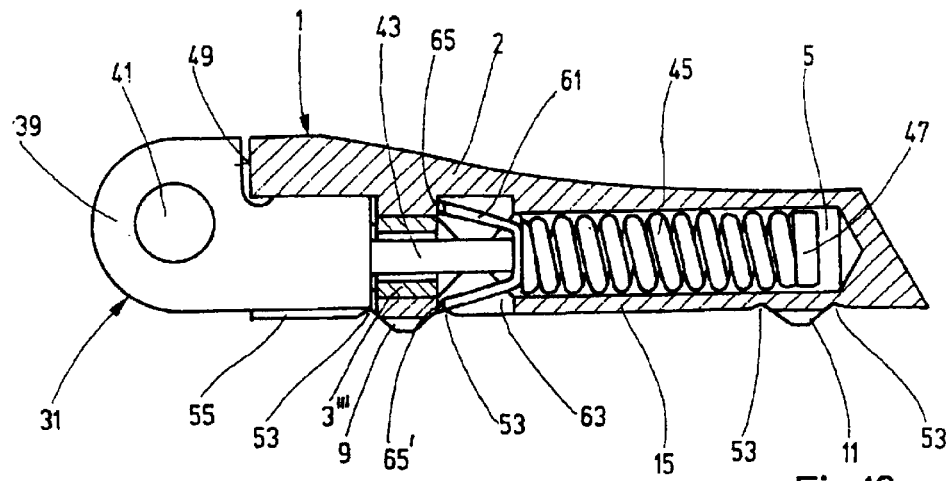
FIGS. 12 to 14 show further exemplary embodiments similar to the spring hinge shown in FIG. 6.

FIG. 1 shows a longitudinal section of a spring hinge 1 for spectacles, having a housing 2 and a supporting body 3. It can be seen that the housing 2 has a cavity, which is designed here as a cylindrical recess 5 into which the supporting body 3 can be inserted. The housing 2 comprises a first welding projection 9 and a second welding projection 11 which serve to electrically weld the housing 2 to an ear piece (not shown here) of spectacles. During the welding, forces which are indicated by two arrows 13, 13' occur at the welding projections 9 and 11. Depending on the design of the housing 2, the forces could lead to an undesirable deformation of the housing 2. It can be seen that the supporting body 3 is inserted into the housing 2 in the region of the first welding projection 9. That force acting during the welding which is indicated by the arrow 13 is therefore transmitted via a housing wall 15 directly to the supporting body 3. Undesirable deformations of the housing 2 in the region of the housing wall 15 are thus virtually ruled out. Adjoining the end of the recess 5 is a supporting region 17 which is made of solid material and serves to absorb those forces transmitted during the welding which are indicated by the arrow 13'. The supporting body 3 and the supporting region 17 thus give the housing 2 the necessary stability for the welding process. After the welding operation, the supporting body 3, which is fastened here to a rod 19, can be removed from the recess 5 by means of the rod 19. A hinge element can thus be put into the recess 5 after the welding.

FIG. 2 shows a plan view of the end face of the housing 2. The same parts are provided with the same reference numerals, so that reference is made to the description relating to FIG. 1.

The supporting body 3 with the rod 19 can be seen, the supporting body 3 being located in the cylindrical recess 5 in the region of the first welding projection 9 and a further first welding projection 9'. It can also be seen that the housing 2 is a closed housing which has only one opening, which is formed by the recess 5.

FIG. 3 shows the housing 2 as in FIG. 2 with the difference that it is welded to an ear piece 21 of spectacles. Material displaced during the welding can be seen, this material, in the form of bulges 23, being located laterally at the transition 25 between the housing 2 and the ear piece 21 of the spectacles. The supporting body 3 bears against the inside of the housing wall 15 and supports the latter. In addition to the supporting function, this offers the advantage that material softened during the welding operation cannot pass into the recess 5, so that malfunctions of the spring hinge are reliably avoided. On account of the supporting effect of the supporting body 3, deformations of the inner surface of the recess 5 are virtually ruled out.

FIG. 4 shows a further exemplary embodiment of the housing 2 in the same view as shown in FIGS. 2 and 3. The same parts are provided with the same reference numerals, so that reference is made in this respect to the description relating to the preceding figures.

The essential difference from FIG. 2 consists in the fact that a center welding projection 27 is provided instead of the first welding projections 9, 9'. On account of the arrangement of the supporting body 3 in the region of the center welding projection 27, it is possible for the housing 2 to remain undeformed despite the forces which occur during the electric welding. Furthermore, it is ensured that material softened during the welding operation cannot pass into the cylindrical recess 5 and lead there to undesirable bulges.

FIG. 5 shows the housing 2 shown in FIG. 4 of the spring hinge 1 with the ear piece 21 of the spectacles. The same parts are provided with the same reference numerals, so that reference is made in this respect to the description relating to the preceding figures.

The essential difference from FIG. 3 consists in the fact that the welding operation causes no undesirable lateral bulges 23. This is due to the fact that the welding projection 27 is arranged centrally, so that regions of the welding projection 27 which are softened by the welding operation cannot spread up to the outer surfaces of the housing 2. That region of the housing wall 15 which lies in the center, in the immediate vicinity of the center welding projection 27 and of the supporting body 3, is also softened during the welding operation. In this case, the supporting body 3 ensures that undesirable deformations of the inner surface of the cylindrical recess 5 are ruled out.

FIG. 6 shows a partial longitudinal section of a spring hinge 1 having a housing 2 and a hinge element 31 which projects into the cylindrical recess 5 of the housing 2 of the spring hinge 1 and is fixed there by means of a top bead 33 and a bottom bead 35. The hinge element 31 essentially has a bearing body 39 having a hole 41 and a spring pin 43 having a spring element, designed here as a helical spring 45, and a spring stop 47. The spring stop 47 is firmly connected to the spring pin 43 of the hinge element 31 or is formed by this spring pin 43, for example by shaping the end of the spring pin. The helical spring 45 is guided by the spring pin 43 and is located between the spring stop 47 and the top bead 33 and the bottom bead 35 of the housing 2. The two beads 33 and 35 constrict the free interior space of the recess 5 in such a way that they act as a stop for the helical spring 45. If a tensile force is exerted on the hinge element 31 during use of the spring hinge 1, deformation of the helical spring 45 takes place in such a way that restoring forces are built up, and these restoring forces pull the hinge element or its spring pin 43 back into the interior of the recess 5. In the representation according to FIG. 6, restoring forces acting to the right are thus exerted on the hinge element 31 by the helical spring 45, so that the bearing body 39 forming a hinge lug is pulled against a bearing surface 49, which is formed by the left-hand front side of the housing 2 of the spring hinge 1. The basic function of the spring hinge 1 is known in principle, so that it is only dealt with briefly here: a center-part hinge, which is fastened to the center part of spectacles, is attached to the hinge element 31, for example by means of a screw which passes through the hole 41. When the ear pieces of the spectacles are swung out, the spring hinge 1 being attached to said ear pieces, tensile forces are exerted on the hinge element 31, and the helical spring 45 counteracts said tensile forces. The center-part hinge has bearing surfaces which bear against the bearing surface 49 and ensure defined basic positions of the ear pieces relative to the center part. In this way, the ear pieces are held firstly in the swung-in position and secondly in the swung-out position by the spring hinge 1.

The helical spring 45 has a reinforced region 51 which, in the exemplary embodiment shown here, consists of two blocked spring coils. The reinforced region 51 lies in the immediate vicinity of the welding projection 37. The reinforced region 51 of the helical spring 45, as supporting body 3, thus counteracts undesirable deformations of the housing 2 during a welding operation.

In this exemplary embodiment, the welding projection 37 and a second central welding projection 11' of the housing 2 have annular recesses 53 which run directly next to the welding projections 37, 11' and serve to accommodate material displaced during the welding operation. That is to say that material softened and displaced during the welding operation is channeled by means of the recesses 53. Thus the material softened during the electric welding is collected and bulges, as are explained with reference to FIG. 2, are avoided.

FIG. 7 shows a bottom view of the spring hinge 1 shown in FIG. 6. The same parts are provided with the same reference numerals, so that reference is made in this respect to the description relating to the preceding figures.

The housing wall 15, with the surrounding welding projection 37 and the second welding projection 11', and the hinge element 31 with the hole 41 (indicated here by dotted line), can be seen in the bottom view. In this view, it becomes clear that the welding projection 37, which surrounds the bead 35, and the second welding projection 11' are provided centrally on the housing wall 15 as viewed in the longitudinal direction. Located in the center of the welding projection 37 is the bottom bead 35, which fixes the helical spring 45 and thus the hinge element 31 in the cylindrical recess 5 of the housing 2. A groove 55, in which the hinge element 31 engages, can be seen in the housing wall 15. The groove 55 forms a sliding bearing and thus a guide for the hinge element 31, this guide preventing rotation of the hinge element 31 about the center axis of the spring pin 43.

FIG. 8 shows a further exemplary embodiment of the spring hinge 1 shown in FIG. 6. The same parts are provided with the same reference numerals so that reference is made in this respect to the description relating to the preceding figures.

The essential difference from FIG. 6 consists in the fact that the spring hinge 1 has a supporting body 3' with a groove 57 open on one side. In this case, the supporting body 3' serves as a guide for the spring pin 43 and as a spring stop for the helical spring 45. On account of the spring forces of the helical spring 45, the supporting body 3' is pressed against the bottom bead 35, which projects into the free interior space of the recess 5 and thus fixes the hinge element 31 in the recess 5 of the housing 2 via the supporting body 3' and via the helical spring 45. The functional principle, already described with respect to FIG. 6, of the spring hinge 1 is obtained on account of the spring forces of the helical spring 45, which act on the one hand on the spring stop 47 and on the other hand via the supporting body 3' and the bottom bead 35 on the housing 2.

The supporting body 3' thus runs against the bottom bead 35 in such a way that it is located in the immediate vicinity of the welding projection 37. Thus, as already described beforehand, the supporting body 3', during an electric welding operation, prevents undesirable displacements of material and possible deformations of the housing 1.

Figures 9, 10, 11:
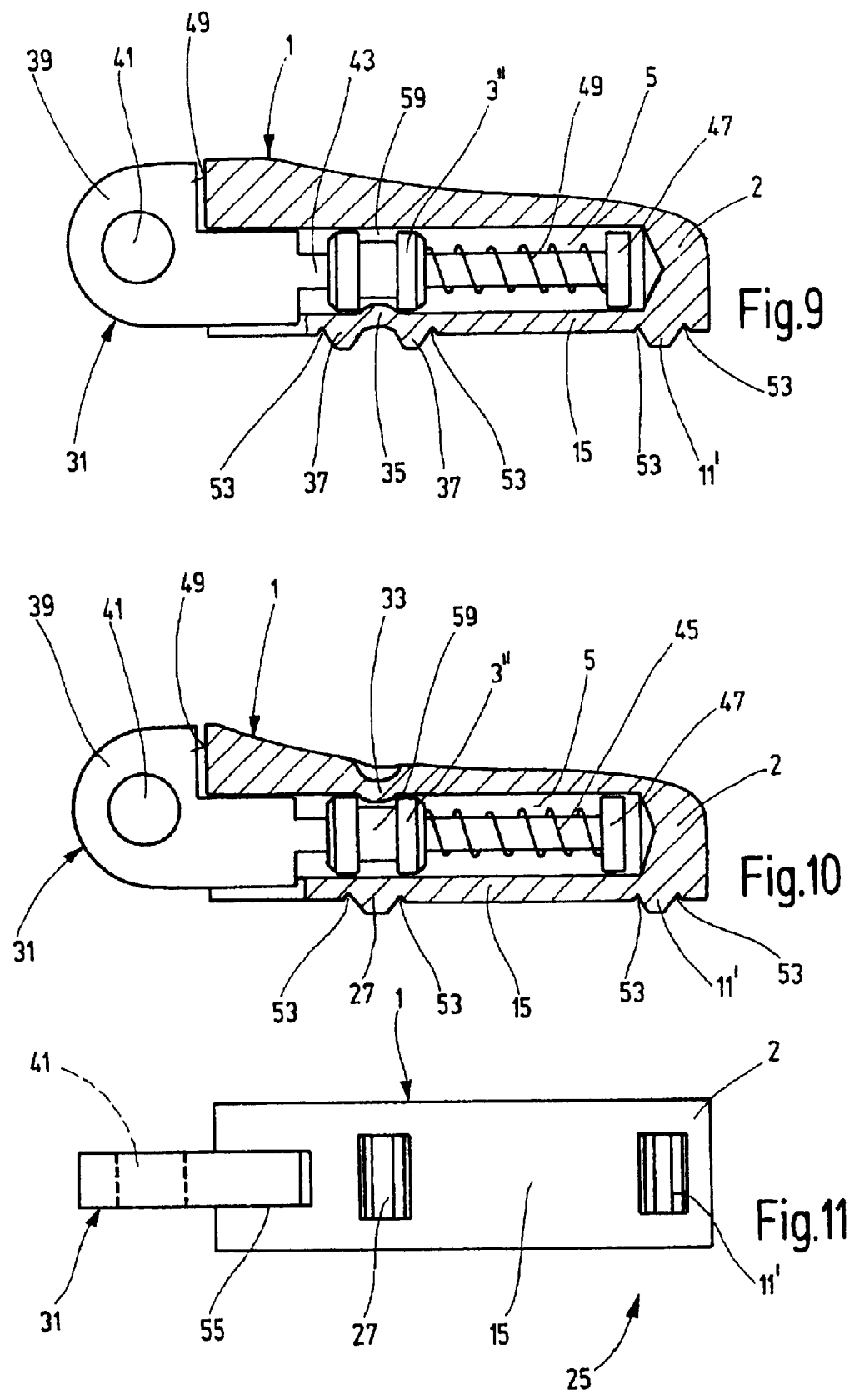

FIG. 9 shows a further advantageous exemplary embodiment of the spring hinge 1. The same parts are provided with the same reference numerals, so that reference is made to the description relating to the preceding figures.

A supporting body 3" can be seen, this supporting body 3", unlike the supporting body 3', having an encircling groove 59 with two lateral boundary flanks. The bottom bead 35 of the housing 2 engages in the groove 59 and thus fixes the supporting body 3" in the cylindrical recess 5 of the housing 2. In this case, the supporting body 3" is arranged in the cylindrical recess 5 of the housing 2 in such a way that it lies in the immediate vicinity of the welding projection 37. The supporting body 3" thus acts firstly—as already described—as a supporting body, secondly as a guide for the spring pin 43 and thirdly, by means of the encircling groove 59 and the bottom bead 35, as fixing for the hinge element 31 in the housing 2.

FIG. 10 shows a further exemplary embodiment of the spring hinge 1. The same parts are provided with the same reference numerals, so that reference is made in this respect to the description relating to the preceding figures.

The central welding projection 27—as viewed in the longitudinal direction of the housing 2—and the likewise central welding projection 11' can be seen. The top bead 33 of the housing 2 engages in the encircling groove 59 of the supporting body 3". In this embodiment, it is especially advantageous that material of the housing wall 15 is displaced into the recess 5 of the housing 2 during the electric welding. In this case, the supporting body 3" and the welding projection 27 are arranged in such a way that the displaced material of the housing wall 15 engages in the encircling groove 59 of the supporting body 3".

In this exemplary embodiment, the material displaced into the recess 5 of the housing 2 serves as additional fixing for the supporting body 3". This offers the advantage that the process step of incorporating the bottom bead 35 described with respect to the preceding figures can be omitted. If need be, the top bead 33 may also be dispensed with in this case, so that an operation—incorporating the bead 33—is omitted.

FIG. 11 shows a bottom view of the spring hinge 1 shown in FIG. 10. The same parts are provided with the same reference numerals, so that reference is made in this respect to the description relating to the preceding figures.

The central welding projection 27 and the second central welding projection 11' can be seen. The central welding projection 27 has an elongated shape which runs transversely to the longitudinal direction of the housing 2 and which ensures a specific displacement of material into the groove 59 of the supporting body 3" during the welding operation.

In particular, the following becomes clear: beads may be provided in order to fix the hinge element in the interior of the housing of the spring hinge. In this case, there may in each case be a single bead at the top and bottom, or else there may also be two beads, one at the top and one at the bottom. In addition to or instead of the beads, wall regions of the housing which have been deformed by the electric welding operation may be provided, these wall regions projecting into the recess in the housing and thus fixing the hinge element. The term "fixing" here is merely intended to mean that the hinge element cannot be pulled completely out of the housing. The free mobility of the hinge element must be retained in order to ensure the basic function of the spring hinge. When the hinge element is fixed, it is therefore merely ensured that an abutment is formed for the spring element designed as a helical spring. Thus the restoring forces produced when the hinge element is being pulled out can be built up.

FIG. 12 shows a further advantageous embodiment of the spring hinge 1 having a latching element 61. The same parts are provided with the same reference numerals, so that reference is made in this respect to the description relating to the preceding figures.

Unlike the preceding exemplary embodiments, the housing 2 has a groove 63 which is open at the bottom and intersects the cylindrical recess 5 of the housing 2 at the top and bottom. As a result, steps 65 and 65', in which the latching element 61 engages, are formed. The latching element 61 has an opening, through which the spring pin 43 passes.

In FIG. 12, the latching element 61 is in the latched state, that is to say in bearing contact with the steps 65, 65', and forms a stop for the helical spring 45. Here, the latching element 61 may at the same time serve as a guide for the spring pin 43 of the hinge element 31. The hinge element 31 is held in the cylindrical recess 5 of the housing 2 via the latching element 61 by means of the spring forces, already described, of the helical spring 45.

The spring hinge 1 has a supporting body 3''' which is located in the immediate vicinity of the welding projection 9. The exemplary embodiment shown here has four welding projections arranged in pairs, of which only the welding projection 9 and the welding projection 11 can be seen here. The supporting body 3''' here serves as a guide for the spring pin 43 and thus for the hinge element 31 along the center axis of the guide rod 43 and serves to stabilize the housing 2 during a welding process. It can also be seen that the housing wall 15 is interrupted by the groove 63 and by the groove 55 and is thus open at the bottom.

Figure 13:
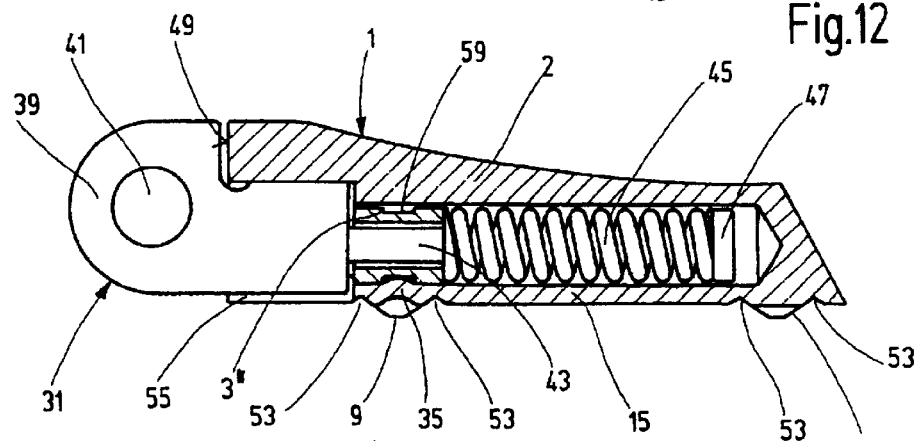

FIG. 13 shows a further exemplary embodiment of the spring hinge 29 with the supporting body 3" and the bottom bead 35, which is arranged between the first welding projection 9 and the first welding projection 9', which cannot be seen here. The same parts are provided with the same reference numerals, so that reference is made in this respect to the description relating to the preceding figures.

In this advantageous exemplary embodiment of the invention, four welding projections are provided on the spring hinge 1 for connecting to an ear piece of spectacles, of which welding projections the first welding projection 9 and the second welding projection 11 can be seen here. The bottom bead 35 is incorporated in the housing wall 15 of the housing 2 in such a way that it lies between the first welding projection 9 and the first welding projection 9' (not shown here) lying in front of the cutting plane. The bead 35, on the inside of the cylindrical recess 5 of the housing 2, engages in the encircling groove 59 of the supporting body 3", as a result of which the supporting body 3" is fixed in the cylindrical recess 5 of the housing 2. Thus the supporting body 3'''—as already described—acts as a stop for the helical spring 45 and thus at the same time fixes the hinge element 31 in the housing 2 of the spring hinge 1.

In addition to the fixing by the bottom bead 35, material of the housing wall 15 of the housing 2 which has been softened and displaced during the welding can be displaced into the interior of the cylindrical recess 5. In the exemplary embodiment shown here, the first welding projections 9, 9', in a similar manner to the exemplary embodiment described in FIG. 10, are arranged in such a way that they are located in the immediate vicinity of the encircling groove 59 of the supporting body 3". This means that the material displaced into the interior of the housing 2 engages in the groove 59 and thus fixes the supporting body 3" in addition to the fixing of the latter by the bottom bead 35. It becomes clear that, on account of the material displaced during the electric welding, the bead 35 may be readily dispensed with.

Figure 14:
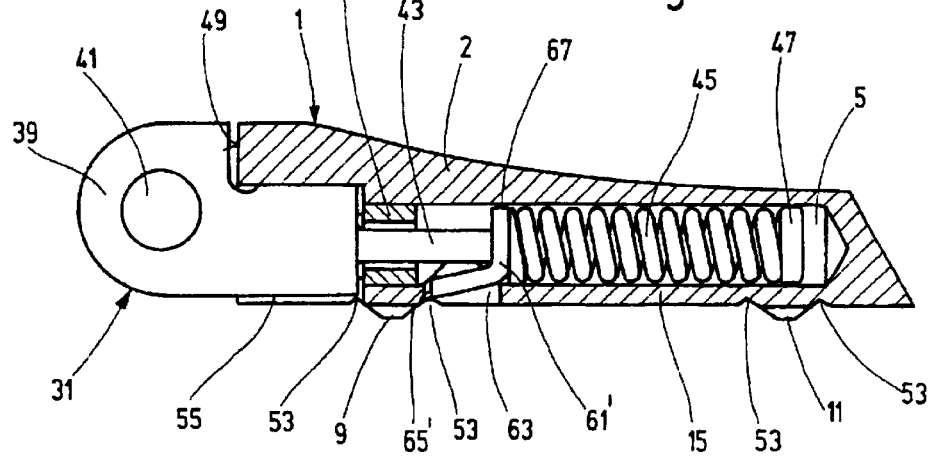

FIG. 14 shows a further advantageous exemplary embodiment of the spring hinge 29 having a latching element 61'. The same parts are provided with the same reference numerals, so that reference is made in this respect to the description relating to the preceding figures.

It can be seen that the groove 63 open at the bottom extends only up to about the center axis of the cylindrical recess 5 of the housing 2. This results in the step 65', in which the latching element 61' engages. In the latched state, the latching element 61' engages in the step 65'. In the process, it serves as a stop for the helical spring 45 and is pressed against a supporting region 67 of the housing 2 on account of the spring forces of the helical spring 45. The latching element 61' has a suitable opening (not shown here), through which the spring pin 43 passes, the latching element 61' additionally bearing against the spring pin 43 and thus being stabilized.

On the basis of the examples shown here, it becomes clear that the shape and type and attachment of the supporting body may be varied. Thus it is conceivable to provide the supporting body on the hinge element 31, to design it as a cube or to design it in any desired shape. However, the external shape of the supporting body is preferably adapted to the inner contour of the recess 5. It is then also conceivable, instead of the cylindrical recess, to provide a rectangular recess or a cavity of any desired configuration in the housing of the spring hinge 1. It is also possible to provide a plurality of insertable supporting bodies of any desired configuration and/or removable supporting bodies designed as a separate part for a plurality of welding projections. It is essential in this case that the supporting body is arranged in the region of welding projections and directs or influences material possibly displaced during a welding process in a desired manner and increases the stability of the housing of the spring hinge during the welding process and/or during subsequent use of the spring hinge. In addition, it is possible to provide any desired fixing elements, such as latching or spring elements, beads or the like, for fixing the hinge element in the housing and to apply the restoring forces for the hinge element by any desired spring elements, such as, for example, helical springs, meander springs, torsion springs or the like.

The housings 2 of the spring hinges 1 are preferably designed in such a way that the currents occurring during the electric welding are conducted through the housing 2 at a distance from the spring element, that is to say the helical spring 45 in this case. Excessive heating and weakening of the spring element is thus avoided, as is tacking of the helical spring 45 to the housing 2. The currents can be influenced by different wall thicknesses of the housing 2, but also by an electrically conductive supporting body being provided, as has been described here. This electrically conductive supporting body is then preferably arranged in the region of the welding projections in order to realize an especially low electric resistance here. The electric currents are thus conducted through the housing and the supporting body into the welding projections, which thus melt and provide the material required for the welding operation. It becomes clear that the welding projections can thus not only be arranged on the housing underside, which faces the ear piece, but can also be arranged on the ear-piece top side. The welding projections present on the ear piece can then interact with a spring hinge 1 to be attached, or with its housing. However, care is to be taken in this embodiment to ensure that the spring hinge is attached to the welding projections in such a way that the supporting body can reliably absorb the forces occurring during the electric welding. It is therefore found that the exemplary embodiments explained here with reference to the figures are to be preferred, because the welding projections can then be arranged exactly in the desired regions.

A common feature of all the exemplary embodiments shown here is that the hinge element may be designed as a pre-assembled module and inserted into the housing 2.

What is claimed is:

1. A weldable spring hinge comprising:
   a housing having a cavity in the form of a recess and adapted for receiving a hinge element therein, the housing having an exterior with at least one welding projection, the projection is a part of the housing and is at a location along the housing to which welding force is applied during welding,
   a supporting body which is separate from the housing and separate from the hinge element, the body being movably inserted and positioned into the cavity at the location of the welding projection of the housing for supporting the housing during welding at the welding projection, to block such deformation of the housing caused during welding as would thereafter prevent movement of the hinge element in the housing.

2. The spring hinge of claim 1, wherein the spring hinge housing is electrically weldable.

3. The spring hinge of claim 1, wherein the cavity is in the form of a cylindrical recess.

4. The spring hinge of claim 1, further comprising a hinge element which is installed in the housing;
   the supporting body of the spring hinge being at the hinge element.

5. The spring hinge of claim 4, further comprising a helical spring in the cavity and attached to the hinge element for controlling movement of the hinge element in the cavity.

6. The spring hinge of claim 5, wherein the supporting body is shaped to define a guide element for movement of the hinge element with respect to the housing.

7. The spring hinge of claim 4, wherein the supporting body is shaped to define a guide element for movement of the hinge element with respect to the housing.

8. A weldable spring hinge comprising:
   a housing having a cavity in the form of a recess and adapted for receiving a hinge element therein, the housing having an exterior with at least one welding projection, the projection is a part of the housing and is at a location along the housing to which welding force is applied during welding, a hinge element installed in the housing;
   a supporting body of the spring hinge which is at the hinge element and separate from the housing, the body being movably inserted and positioned in the cavity at the location of the welding projection of the housing for supporting the housing during welding at the welding projection, to block such deformation of the housing caused during welding as would thereafter prevent movement of the hinge element in the housing.

9. The spring hinge of claim 8, further comprising a helical spring in the cavity and attached to the hinge element for controlling movement of the hinge element in the cavity.

10. The spring hinge of claim 9, further comprising a groove in the supporting body, the groove is located generally at the location of the bead when the supporting body is in the cavity, the groove for receiving the bead upon welding force being applied to the welding projection and the bead deforming into the groove.

11. The spring hinge of claim 9, further comprising a groove in the supporting body, the groove is generally at the location of the bead when the supporting body is in the cavity, the groove for receiving the bead upon welding force being applied to the welding projection and the bead deforming into the groove, and material of which the housing is comprised is displaced during electric welding and the displaced material engages in the groove of the body.

12. The spring hinge of claim 4, further comprising a latching element installed in the housing and on the hinge element for fixing the hinge element in the housing.

13. The spring hinge of claim 1, wherein there are at least two of the welding projections at different locations along the length of the housing and the supporting body is located to support the housing at at least one of the welding projections.

14. The spring hinge of claim 1, further comprising at least one bead in the housing positioned for engaging the hinge element for fixing the hinge element in the housing; and
   the welding projection on the housing being located to surround the bead of the housing.

15. The spring hinge of claim 1, wherein the welding projection is electrically weldable;
   the hinge element is so shaped and the welding projection and the housing are of such material that material is displaced during electric welding and the material displaced during electric welding fixes the hinge element in the housing.

16. The spring hinge of claim 1, wherein the housing is produced by metal injection molding technology.

* * * * *